United States Patent [19]
Liu

[11] Patent Number: 6,099,142
[45] Date of Patent: Aug. 8, 2000

[54] MULTIPURPOSE LAMP DEVICE

[76] Inventor: Chen-An Liu, No. 789, Sec. 2, Chung-San Rd., Da-Jia Town, Taichung, Taiwan

[21] Appl. No.: 09/113,365

[22] Filed: Jul. 10, 1998

[51] Int. Cl.[7] .............................. F21L 7/00; F21L 15/12; F21V 21/30
[52] U.S. Cl. ........................ 362/191; 362/184; 362/190; 362/194; 362/196; 362/199; 362/35; 362/399
[58] Field of Search .................................. 362/184, 190, 362/191, 194, 196, 199, 202, 35, 399

[56] References Cited

U.S. PATENT DOCUMENTS

| | | | |
|---|---|---|---|
| 5,117,341 | 5/1992 | Haung | 362/184 |
| 5,697,695 | 12/1997 | Lin et al. | 362/184 |

*Primary Examiner*—Cassandra Spyrou
*Assistant Examiner*—Fayez Assaf
*Attorney, Agent, or Firm*—Bacon & Thomas

[57] ABSTRACT

A multipurpose lamp device includes a casing having equi-angularly spaced longitudinal grooves at the periphery, handle means or tubular lamp means detachably fastened to the longitudinal grooves on the casing, a lamp holder fastened to the casing at one end, the lamp holder having reflector means, and rotary drive means controlled to rotate the reflector means, a battery holder which provides the necessary power supply to the lamp holder, a connector which connects the battery holder to the casing, and a plurality of legs detachably fastened to respective mounting holes on the connector for supporting the lamp device on a surface.

3 Claims, 7 Drawing Sheets

MULTIPURPOSE LAMP DEVICE

BACKGROUND OF THE INVENTION

The present invention relates to lamp devices, and more particularly to a multipurpose lamp device which can be alternatively arranged into different forms for different purposes.

A variety of portable lamp devices have been disclosed for use in different situations for different purposes. These portable lamp devices are handy and functional, however they provide limited functions. For example, a conventional multipurpose portable lamp device may be used as a flash light bar for guiding traffics at night, however it cannot be used as a rotary stage lamp or a third stop lamp.

SUMMARY OF THE INVENTION

It is the main object of the present invention to provide a multipurpose lamp device which can be alternatively arranged into different forms for use as a portable lamp a signal lamp, a flash light bar, a rotary stage lamp, etc. for different purposes. To achieve this and other objects of the present invention, there is provided a multipurpose lamp which is comprised of a casing having equiangularly spaced longitudinal grooves at the periphery, handle means or tubular lamp means detachably fastened to the longitudinal grooves on the casing, a lamp holder fastened to the casing at one end, the lamp holder having reflector means, and rotary drive means controlled to rotate the reflector means, a battery holder which provides the necessary power supply to the lamp holder, a connector which connects the battery holder to the casing, and a plurality of legs detachably fastened to respective mounting holes on the connector for supporting the lamp device on a surface.

DETAILED DESCRIPTION OF THE PREFERRED EMBODIMENT

Figure 1:
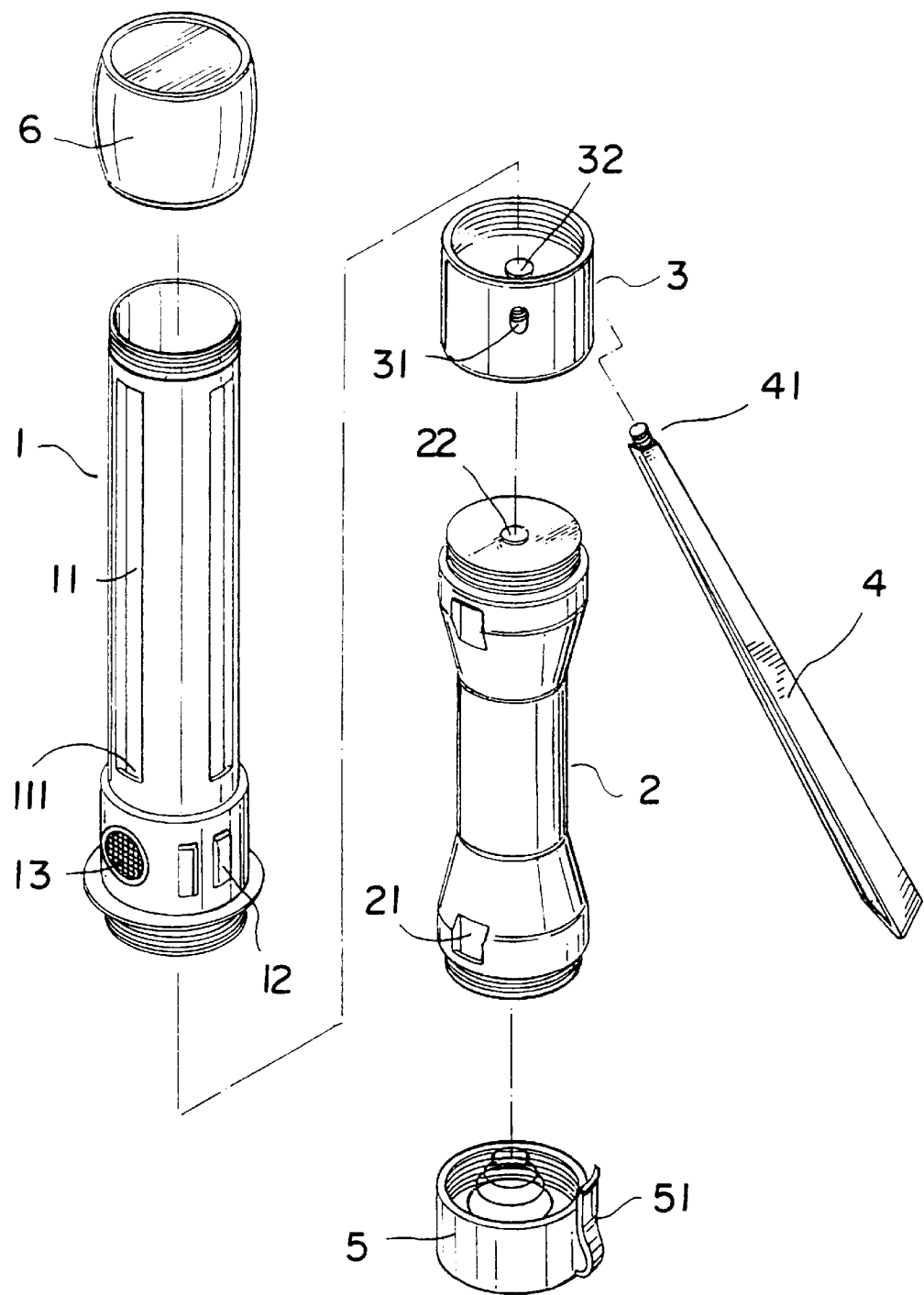
FIG. 1 is an exploded view of a multipurpose lamp device according to the present invention.
Figure 2:
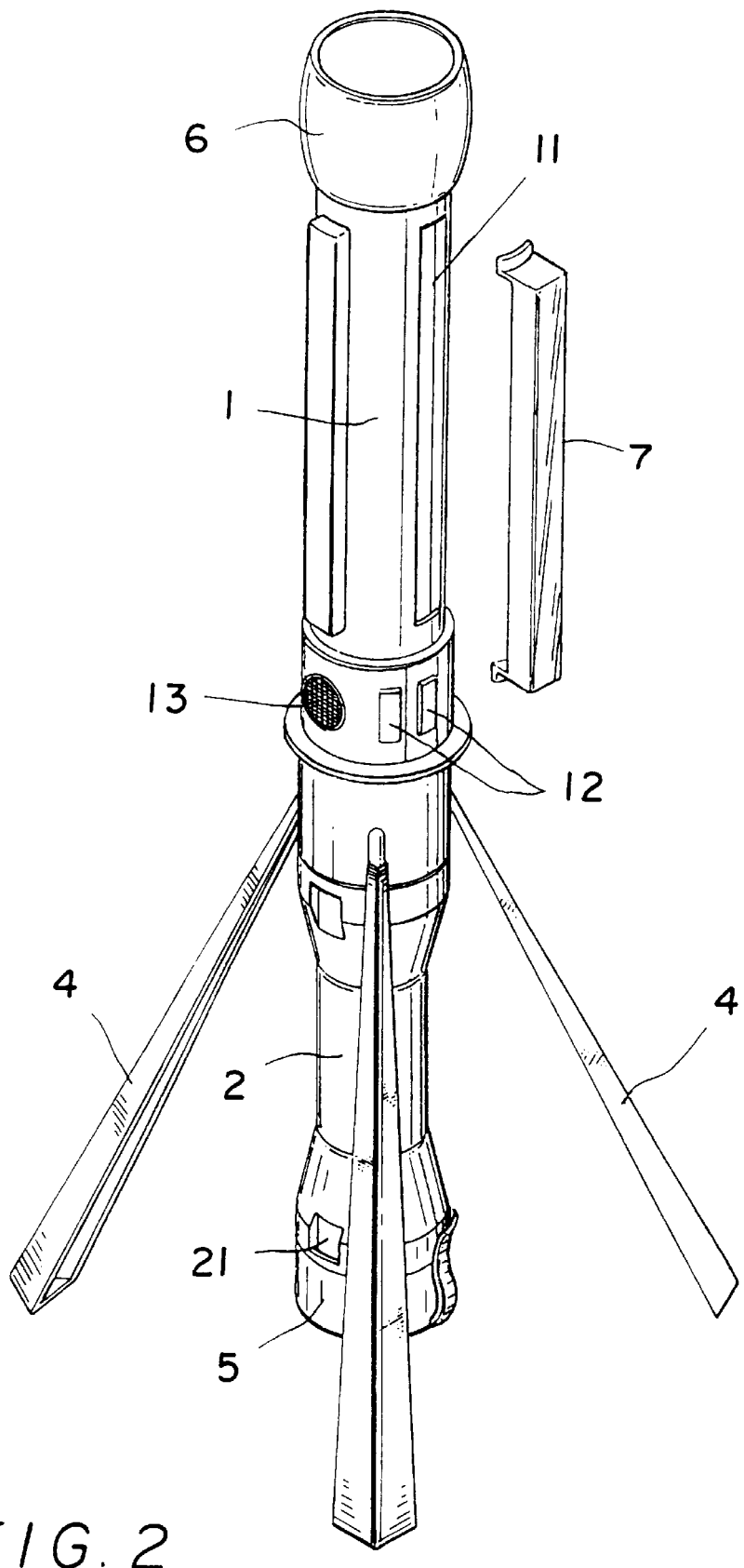
FIG. 2 is a perspective assembly view of the multipurpose lamp device shown in FIG. 1.
Figure 3:
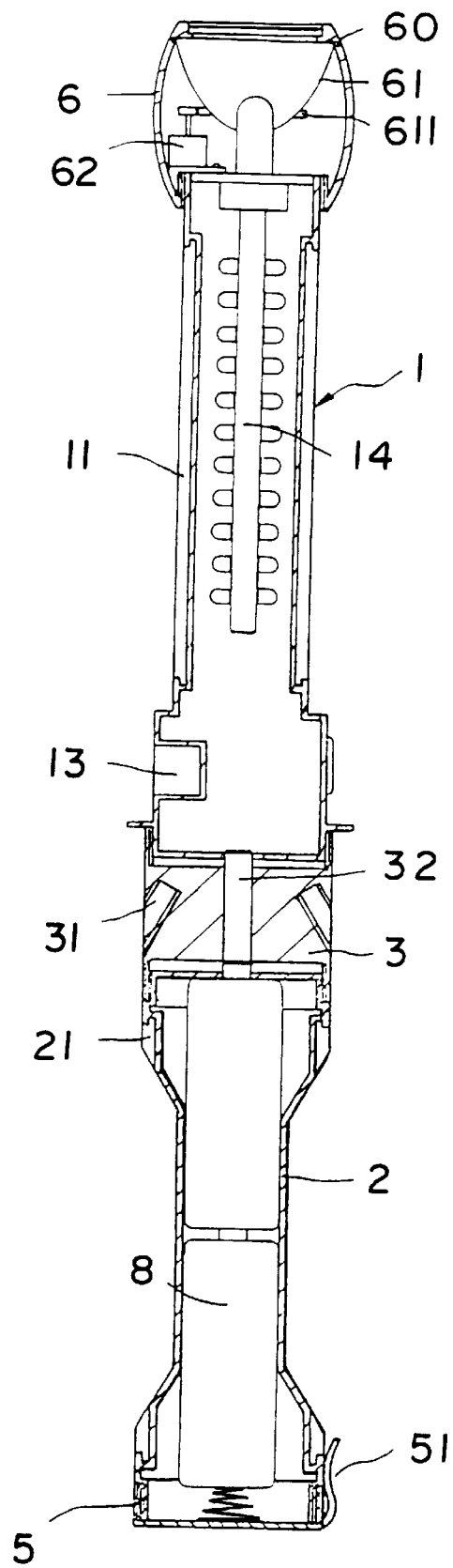
FIG. 3 is a longitudinal view in section of the present invention.

Referring to FIGS. 1, 2 and 3, a multipurpose lamp device in accordance with the present invention in accordance with the present invention is generally comprised of a cylindrical casing 1, a battery holder 2, a connector 3, a plurality of legs 4, a cap 5, and a lamp holder 6.

The casing 1 comprises a plurality of longitudinal coupling grooves 11 spaced around the periphery, a plurality of mounting slots 111 respectively disposed at the ends of the longitudinal coupling grooves 111, a plurality of sliding switches 12, and a buzzer 13. The buzzer 13 is controlled by one sliding switch 12 to provide an audible warning signal. A warning lamp tube 14 is mounted inside the casing 1, and controlled by one sliding switch 12 to provide a visual warning signal. The battery holder 2 holds a battery set 8 on the inside, having an electrically conductive coupling hole 22 at the center of the top end thereof, and a plurality of mounting hole 21 at the periphery at suitable locations. The connector 3 comprises a plurality of screw holes 31 equiangularly spaced around the periphery, and a center wire hole 32 through the longitudinal central axis thereof. The connector 3 has one end fastened to one end of the casing 1 by a screw joint. The cap 5 is fastened to one end of the battery holder 2 opposite to the casing 1 by a screw joint, having a clip 51 integral with the periphery thereof for fastening. The lamp holder 6 is fastened to one end of the casing 1 opposite to the connector 3 by a screw joint, having a coupling groove 60 on the inside. A reflector 61 is mounted inside the lamp holder 6 and revolvably coupled to the coupling groove 60. The reflector 61 has a toothed portion 611 around the periphery. A rotary drive for example a motor drive 62 is mounted inside the lamp holder 6 and coupled to the toothed portion 611 of the reflector 61. When the motor drive 62 is started, the reflector 61 is rotated within the lamp holder 6. The legs 4 each have a screw rod 41 at one end for threading into the screw holes 31 on the connector 3.

When assembled (the legs 4 are excluded), the lamp device can be conveniently carried with the hand, and used as a portable illuminator or flash light bar. By, means of the sliding switches 12, the lamp device is controlled to produce a visual warning signal and/or an audible warning signal. By means of the clip 51 on the cap 5, the lamp device can be fastened to support means. Furthermore, attachment elements 7 may be fitted into the longitudinal grooves 11 and fastened to the mounting slots 111 at the ends of the longitudinal grooves 11. The attachment elements 7 can be used as handle means. Alternatively, the attachment elements 7 can be tubular lamps, or magnetic members for securing the lamp device to the metal frame of a motor vehicle.

Figure 4:
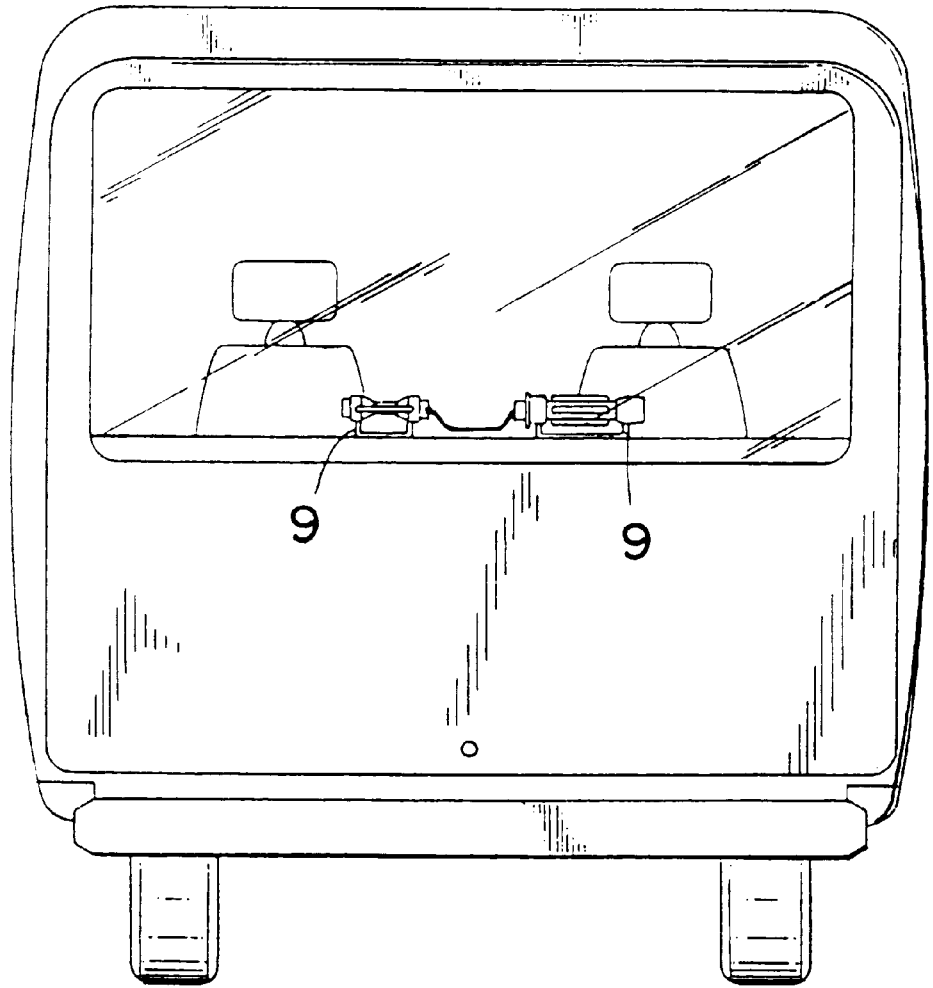
FIG. 4 is an applied vies of the present invention, showing the multipurpose lamp device installed in a car and used as a third stop light.

Referring to FIG. 4, when the battery holder 2 is disconnected from the casing 1, the assembly of the casing 1, the connector 3 and the lamp holder 6 can be installed inside a car by mounting means 9, which is fastened to the mounting slots 111 at the ends of the longitudinal grooves 11 (see also FIG. 1), and connected in parallel with another assembly of the same structure to the brake circuit of the car for use as a third stop light.

Figure 7:
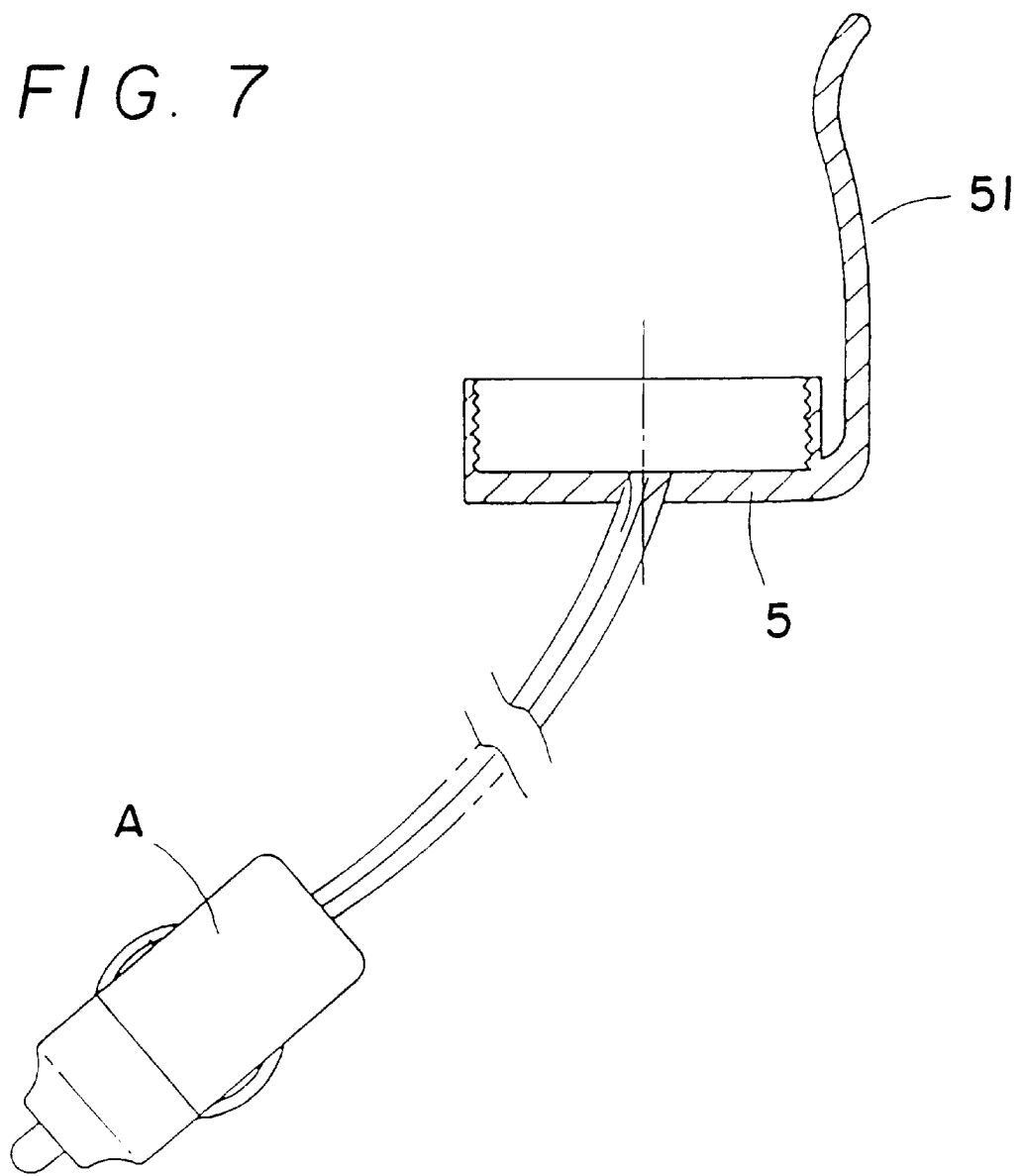
FIG. 7 shows the cap mounted with an electric plug according to the present invention.

Referring to FIG. 7, the cap 5 is mounted with an electric plug A for connection to the socket for cigarette lighter to obtain battery power supply from the motor vehicle.

Figure 5:
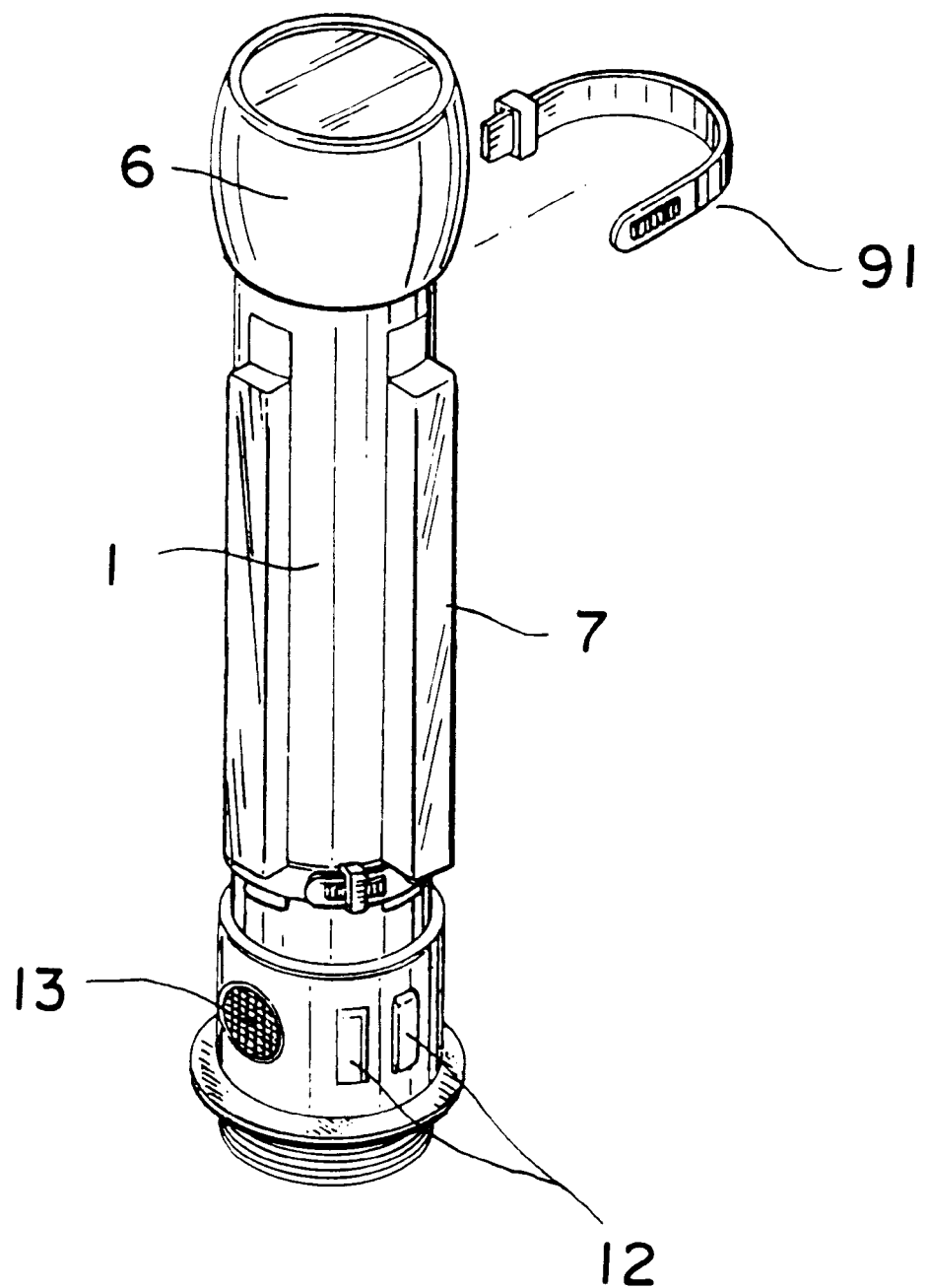
FIG. 5 shows another installation example of the attachment elements according to the present invention.

Referring to FIG. 5, when the attachment elements 7 are respectively mounted in the longitudinal grooves 11 on the casing 1, a strap 91 may be used to secure the attachment elements 7 to the casing 1.

Figure 6:
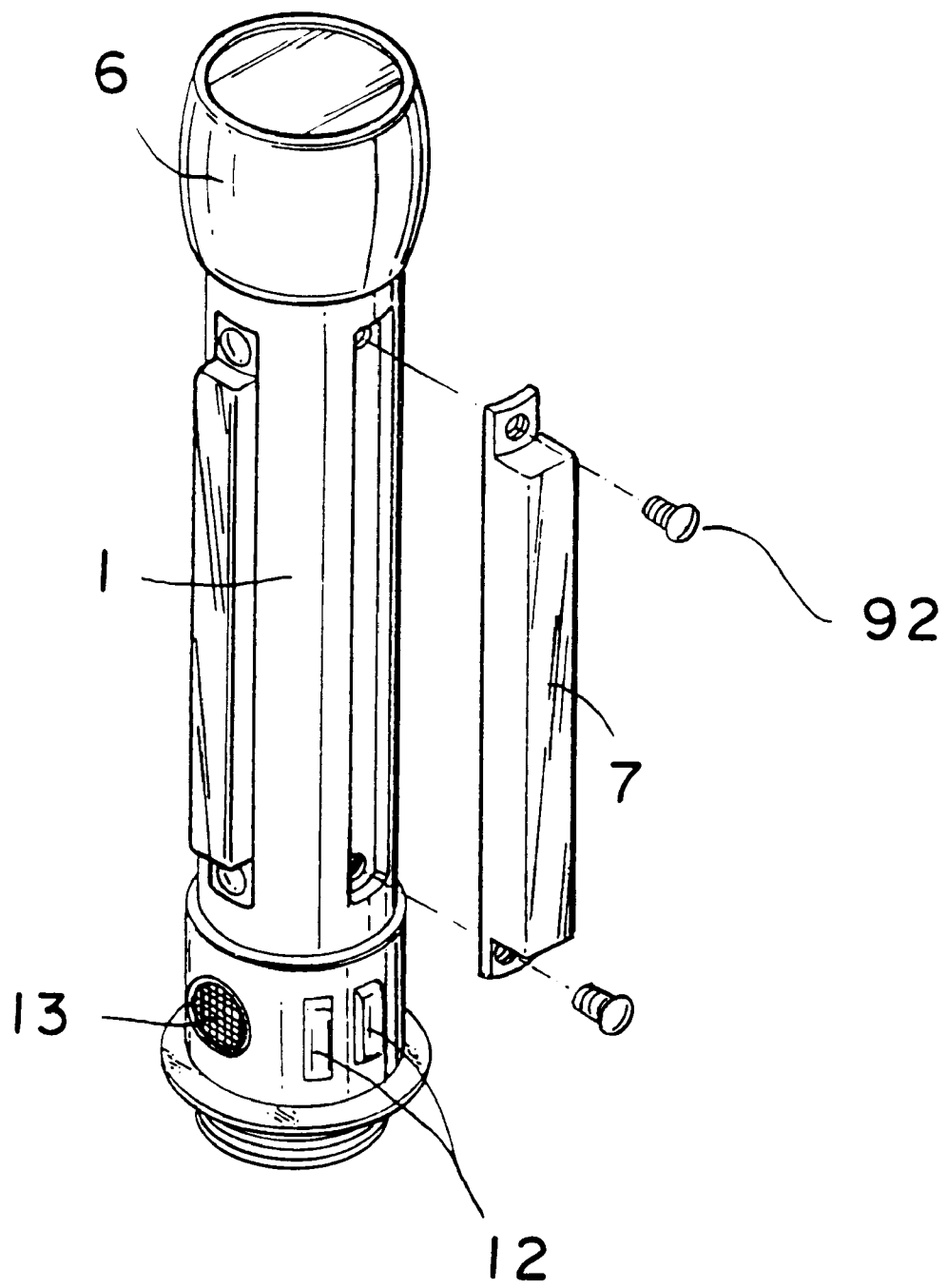
FIG. 6 shows still another installation example of the attachment elements according to the present invention.

Referring to FIG. 6, when the attachment elements 7 are respectively mounted in the longitudinal grooves 11 on the casing 1, screws 92 are threaded through respective through holes at both ends of each attachment element 7 into respective screw holes at both ends of each longitudinal groove 11 to fix the attachment elements 7 in place.

It is to be understood that the drawings are designed for purposes of illustration only, and are not intended as a definition of the limits and scope of the invention disclosed.

What the invention claimed is:

1. A multipurpose lamp device comprising:
    a casing having a top end, a bottom end, and a plurality of longitudinal grooves spaced around the periphery and a plurality of attachment elements respectively mounted in said longitudinal grooves, switch means at the periphery;

a lamp holder fastened to the top end of said casing and controlled by said switch means to emit light, said lamp holder comprising reflector means revolvably coupled to an inside coupling groove thereof, and rotary drive means controlled to rotate said reflector means, said reflector means having a toothed portion around the periphery coupled to said rotary drive means;

a battery holder holding battery means on the inside and controlled by said switch means to provide power supply to said lamp holder, said battery holder having a top end, a bottom end, and an electrically conductive coupling hole at the center of said top end;

a cap fastened to the bottom end of said battery holder by a screw joint, said cap having a clip for fastening;

a connector for connecting the top end of said battery holder to the bottom end of said casing, said connector comprising a center through hole, and a plurality of mounting holes equiangularly spaced around the periphery; and a plurality of legs for fastening to the mounting holes on said connector for supporting the lamp device on a surface.

2. The multipurpose lamp device of claim 1 wherein said attachment elements are tubular lamp means.

3. The multipurpose lamp device of claim 1 wherein said attachment elements are handle means.

* * * * *